United States Patent
Ogawa et al.

(10) Patent No.: US 12,419,314 B2
(45) Date of Patent: Sep. 23, 2025

(54) DEVICE, SYSTEM AND METHOD FOR FORMING A FOLDED FOOD PRODUCT

(71) Applicant: RHEON AUTOMATIC MACHINERY CO., LTD., Tochigi (JP)

(72) Inventors: Yuya Ogawa, Tochigi (JP); Kaoru Hamamoto, Tochigi (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 471 days.

(21) Appl. No.: 17/767,529

(22) PCT Filed: Oct. 9, 2020

(86) PCT No.: PCT/JP2020/038308
§ 371 (c)(1),
(2) Date: Apr. 8, 2022

(87) PCT Pub. No.: WO2021/070937
PCT Pub. Date: Apr. 15, 2021

(65) Prior Publication Data
US 2024/0065276 A1    Feb. 29, 2024

(30) Foreign Application Priority Data
Oct. 10, 2019   (JP) .................... 2019-186664

(51) Int. Cl.
*A21C 9/06*   (2006.01)
(52) U.S. Cl.
CPC ................... *A21C 9/063* (2013.01)
(58) Field of Classification Search
CPC .................................. A21C 9/063

USPC ........................................... 99/450.1
See application file for complete search history.

(56) References Cited

U.S. PATENT DOCUMENTS

| | | | |
|---|---|---|---|
| 4,113,819 A * | 9/1978 | Hayashi | A23P 30/25 |
| | | | 264/173.1 |
| 2003/0022838 A1 | 1/2003 | Sheppard et al. | |
| 2004/0006510 A1 | 1/2004 | Lertzman et al. | |
| 2014/0186506 A1 * | 7/2014 | Kato | A21D 8/02 |
| | | | 425/374 |

(Continued)

FOREIGN PATENT DOCUMENTS

| JP | 42-3838 Y1 | 3/1967 |
|---|---|---|
| JP | 59-135828 A | 8/1984 |

(Continued)

OTHER PUBLICATIONS

Written Opinion of International Search Report, JPRO, Aug. 12, 2020.

*Primary Examiner* — Elizabeth M Kerr
*Assistant Examiner* — Simpson A Chen
(74) *Attorney, Agent, or Firm* — Dilworth & Barrese, LLP

(57) ABSTRACT

A movable forming device (10) to fold a dough piece (P) by moving one end (PS) of the dough piece (P) onto the other end (PT) of the dough piece includes at least one suction tool (23) which holds the one end of the dough piece by suctioning and lifting the one end from its upside, and a supporting tool (33) including a support part (33a) which is movable below the suction tool. The one end of the dough piece is grasped between the suction tool and the supporting part by bringing the suction tool and the supporting part closer to each other.

10 Claims, 14 Drawing Sheets

(56) References Cited

U.S. PATENT DOCUMENTS

2020/0236985 A1\* 7/2020 Itou .................. A21C 9/063

FOREIGN PATENT DOCUMENTS

| JP | S 59-135828 | A | * | 8/1984 |
| JP | 11232421 | A | * | 8/1999 |
| JP | 3980414 | B2 | | 9/2007 |
| JP | 2008068546 | A | * | 3/2008 |
| JP | 2014151371 | A | | 8/2014 |
| JP | 2018014905 | A | | 2/2018 |

\* cited by examiner

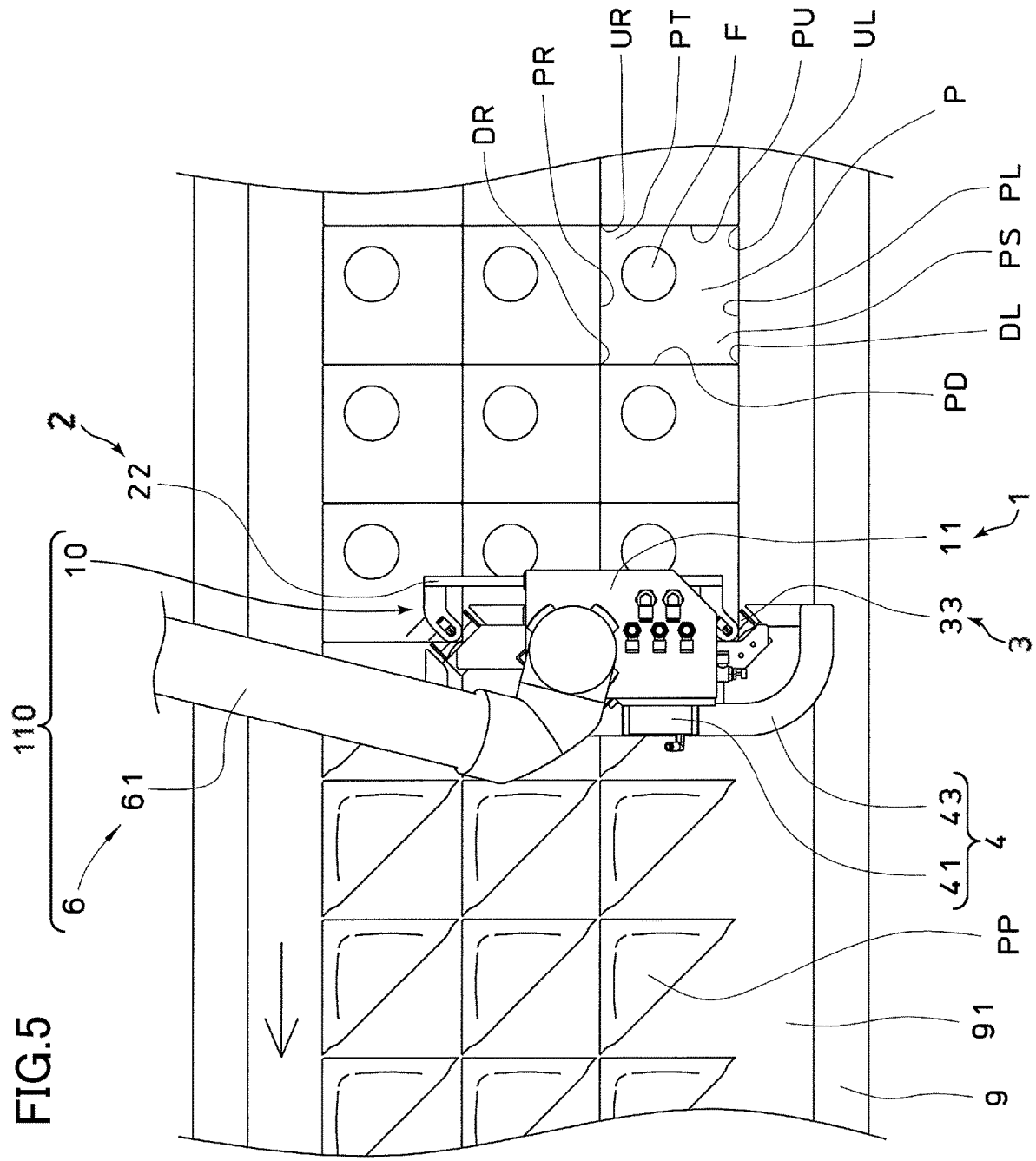

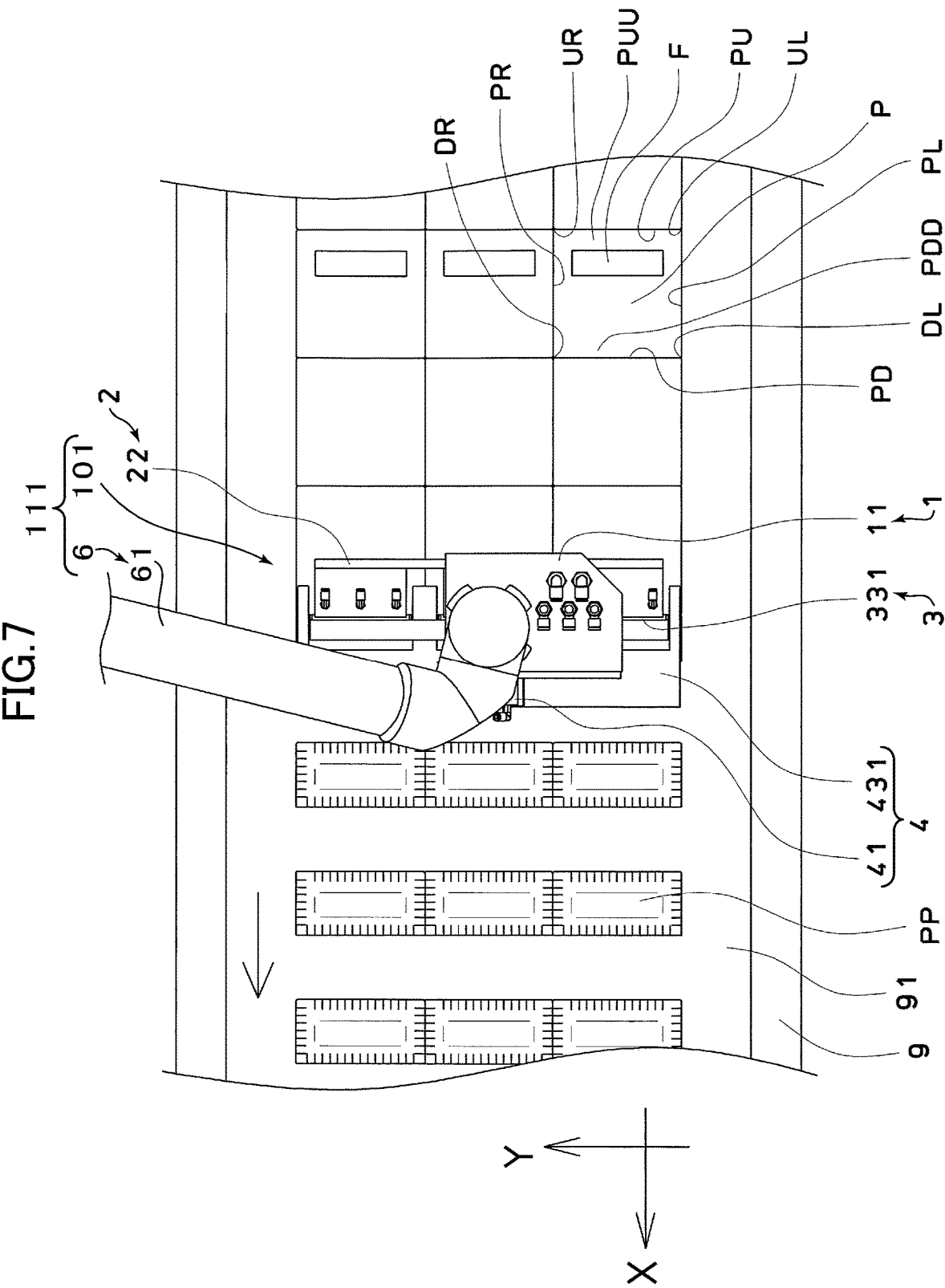

DEVICE, SYSTEM AND METHOD FOR FORMING A FOLDED FOOD PRODUCT

TECHNICAL FIELD

The present invention relates to a forming device, a forming system, and a forming method of folding a food. Specifically, the present invention relates to a forming method and a forming system of forming a folded food product by depositing an inner material, such as cream or jam, onto a flat dough piece of a viscoelastic dough, such as bread dough, and folding the dough piece to enclose the inner material.

BACKGROUND ART

Systems for forming folded food products are conventionally known. The forming system described in the Patent Publication 1 includes a pair of plate bodies with opposing concavities. A flat bread dough is disposed in the concavities, and an inner material, such as bean paste or cream, is disposed on a bread dough portion located on one of the plate bodies. The other plate body is reversed onto the one plate body around a hinge mechanism or a rotational center so that the bread dough is folded to enclose the inner material and is shaped according to the concavities.

The Patent Publication 2 describes a caterpillar conveyor having a mechanism of raising one end of the conveyor, a mechanical finger mechanism for grasping and extending one end of a bread dough piece and turning the one end onto the other end to overlap the ends. The bread dough is positioned so that the one end of the bread dough extends beyond a plate of the caterpillar conveyor in a conveying direction, and an inner material is deposited onto the bread dough. After the caterpillar conveyor is stopped and the plate is raised, the mechanical finger grasps and turns the one end of the bread dough to overlap the one end onto the other end.

PRIOR ART PUBLICATION

Patent Publication 1: Japanese Examined Utility Model No. S42-003838
Patent Publication 2: Japanese Patent Laid-open Publication No. S59-135828
Patent Publication 3: Japanese Patent No. 3980414
Patent Publication 4: Japanese Patent Laid-open Publication No. 2018-014905

SUMMARY OF THE INVENTION

Problem to be Solved by the Invention

In the device described in the Patent Publication 1, operations of previously dividing the dough into a predetermined size and placing the divided dough onto a predetermined position are required. When the flat bread dough is placed to be misaligned with the predetermined position, mal-forming would be caused by misaligning edges of the formed or folded dough with each other, and thus, an operation of placing the dough by hands is usually required. Further, even if the bread dough is placed on the predetermined position, since the bread dough is reversed without being held during the folding operation, misalignment would be caused and thus, variation in the shape and the quality of the folded food product would be caused.

In the device described in the Patent Publication 2, there is a problem that an operation of grasping the bread dough by the mechanical fingers is not stable. Namely, the mechanical fingers could not grasp the one end of the bread dough due to variation of an amount of the dough extending beyond the plate depending on a kind and state of the dough and due to misalignment of the dough by its weight when the dough is raised by the plate.

Further, each of the devices described in the Patent Publications 1 and 2 has complicated structures and is dedicated to a specific folding operation. These devices can only behave as previously and mechanically determined way regarding a size, a folding direction, and an overlapping extent of the folded product. Further, these devices require for stopping conveying the dough during the folding operation so that a time period for one folding operation is relatively long and thus, it is difficult to increase an amount of production. For these reasons, each of these devices cannot be used in recent food manufacturing line which requires that multiple kinds of products can be effectively manufactured.

Means for Solving the Problem

The present invention is directed to a movable forming device to fold a dough piece by moving one end of the dough piece onto the other end of the dough piece, which forming device includes at least one suction tool which holds the one end of the dough piece by suctioning and lifting the one end from its upside; and a supporting tool including a support part which is movable below the suction tool, wherein the one end of the dough piece is grasped between the suction tool and the supporting part by bringing the suction tool and the supporting part closer to each other.

In this forming device, preferably, the supporting part includes a rotatable roller. Further, this forming device, preferably, further includes a pressing tool which presses a peripheral portion of the dough piece overlapped by folding the dough piece.

Further, in this forming device, preferably, the forming device includes the more than two suction tools, and the at least two suction tools are offset from each other along a direction extending from the one end of the dough piece toward the other end of the dough piece, more preferably, at least one of the suction tools is disposed above the peripheral portion of the dough piece.

Further, the present invention is directed to a forming system which includes a forming device according to any one of the above-stated forming devices, and a moving mechanism which moves the forming device.

Further, the present invention is directed to a method of performing a folding operation of a dough piece including a lifting sub-operation of suctioning one end of the dough piece from its upside by a suction tool to lift the one end, a grasping sub-operation of grasping the one end of the lifted dough piece by sandwiching the one end between the suction tool and a supporting part located below the suction tool to grasp the one end, and an overlapping sub-operation of moving the one end of the dough piece toward the other end of the dough piece while the one end is grasped between the suction tool and the supporting part for folding and overlapping the dough piece.

The above-stated method, preferably after the overlapping sub-operation, further includes a pressing sub-operation of pressing peripheral portions of the overlapped dough piece, more preferably after the pressing sub-operation, further includes a bonding sub-operation of releasing the grasped one end of the dough piece, overlapping the one end onto the other end of dough piece, and bonding the one end with the other end.

With the forming device according to the present invention, for example, when the one end of the dough piece is moved onto the other end of the dough piece to fold the dough piece which is flatly disposed on the conveying surface of the conveying device or a tray, the one end of the dough piece is surely grasped by the forming device, because the one end of the dough piece is suctioned to be lifted and is grasped between the suction tool and the supporting part. Thus, during the folding operation, the dough piece is maintained to be always grasped (held) by the forming device, and the folding operation can be accurately and stably performed. Additionally, forming conditions, such as a folding direction and an amount of overlapping the dough piece, can be easily modified.

Further, in the forming device according to the present invention, the folding operation could be continuously performed even if the dough pieces are tightly arranged in a plurality of rows and lines because the one end of the dough piece is suctioned and lifted from its upside. Additionally, the folding operation can be performed without stopping conveying the dough pieces. Thus, an amount of production can be increased. Further, the present invention can be accomplished by a relatively simple structure and enables the folding operation without using a dedicated conveying device so that the present invention can be easily incorporated into an existing food product forming line.

BRIEF DESCRIPTION OF THE DRAWINGS

FIG. 5 is a top view of the forming system of FIG. 1.

FIG. 7 is a top view of an alternative of the first embodiment of the forming system according to the present invention.

DESCRIPTION OF EMBODIMENTS

Referring to FIGS. 1-5, a first embodiment of a forming system and a forming device according to the present invention will be explained. A forming device 10 of the first embodiment is defined as an end effector for a robot 6 included in a food product forming line 100. Further, in the first embodiment, by folding a dough piece P having a shape of an approximate square along its diagonal line (or folding line), a folded food product PP having a shape of an approximate isosceles right triangle is formed. Further, in the present embodiment, a series of sub-operations of the folding operation allows the three folded food products PP to be formed from the three-lined dough pieces P.

Figure 1:
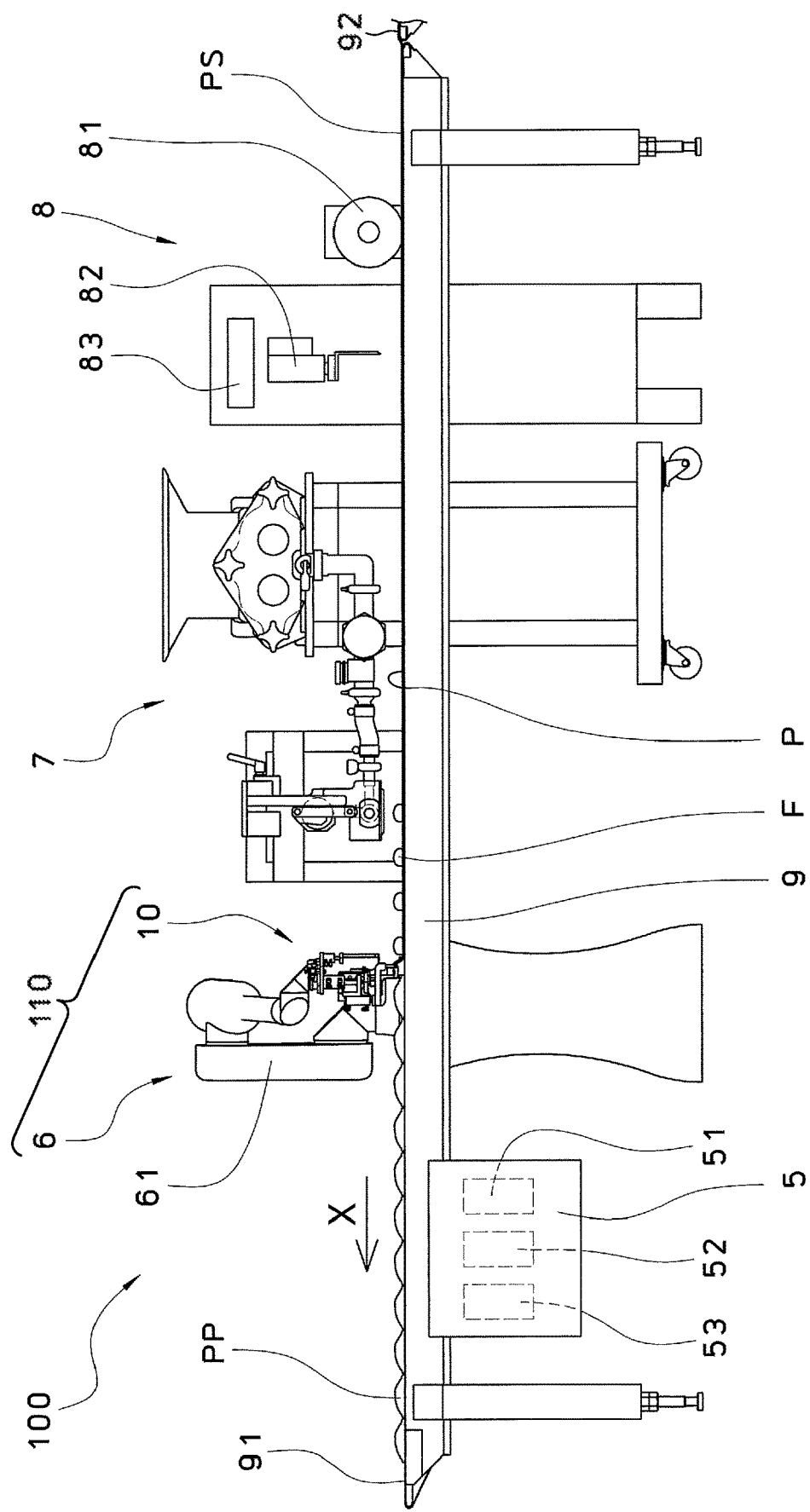
FIG. 1 is a schematical side view of a food producing line which uses a first embodiment of a forming system according to the present invention.
Figure 2:
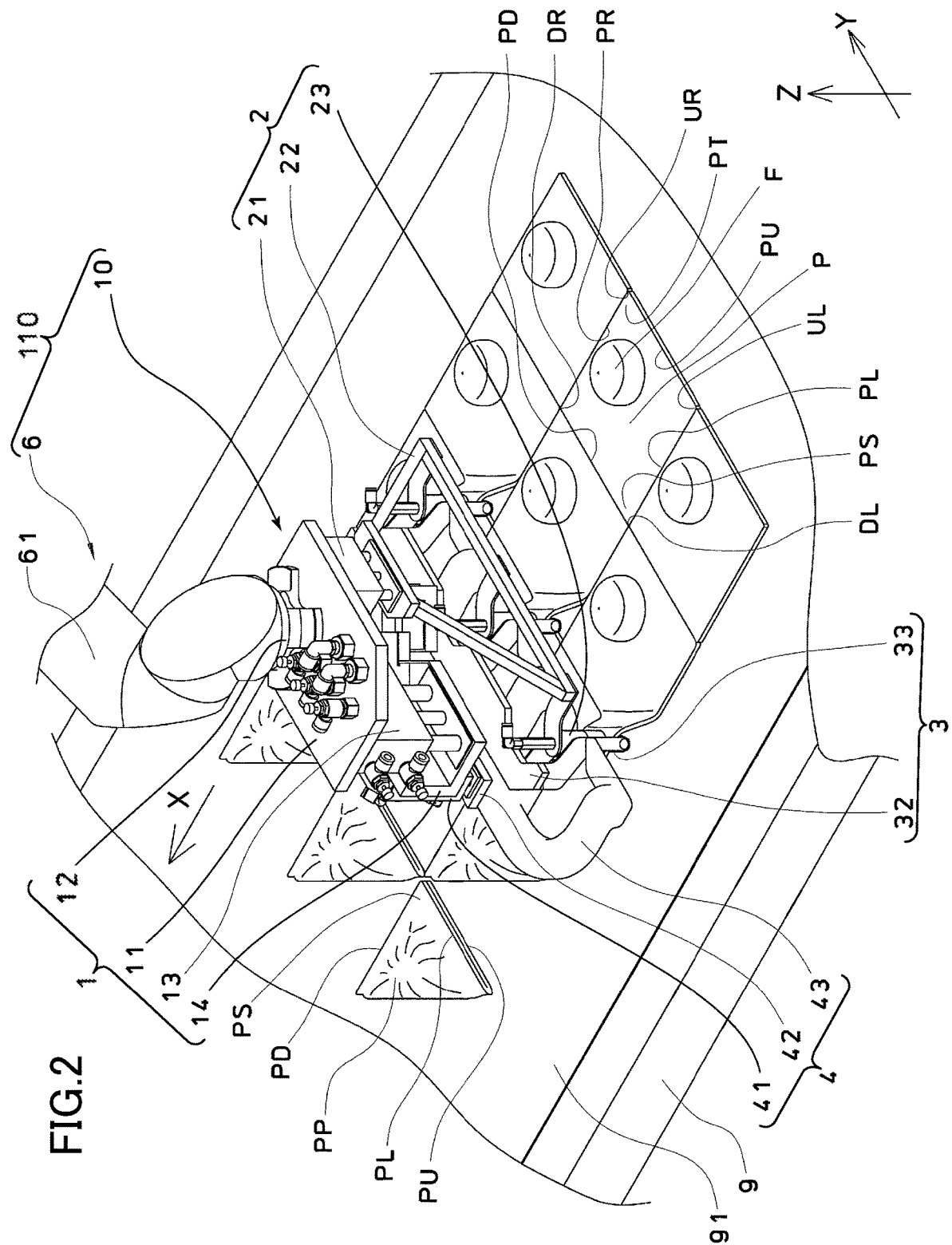
FIG. 2 is a perspective view of the forming system of FIG. 1 in a grasping sub-operation.
Figure 3:
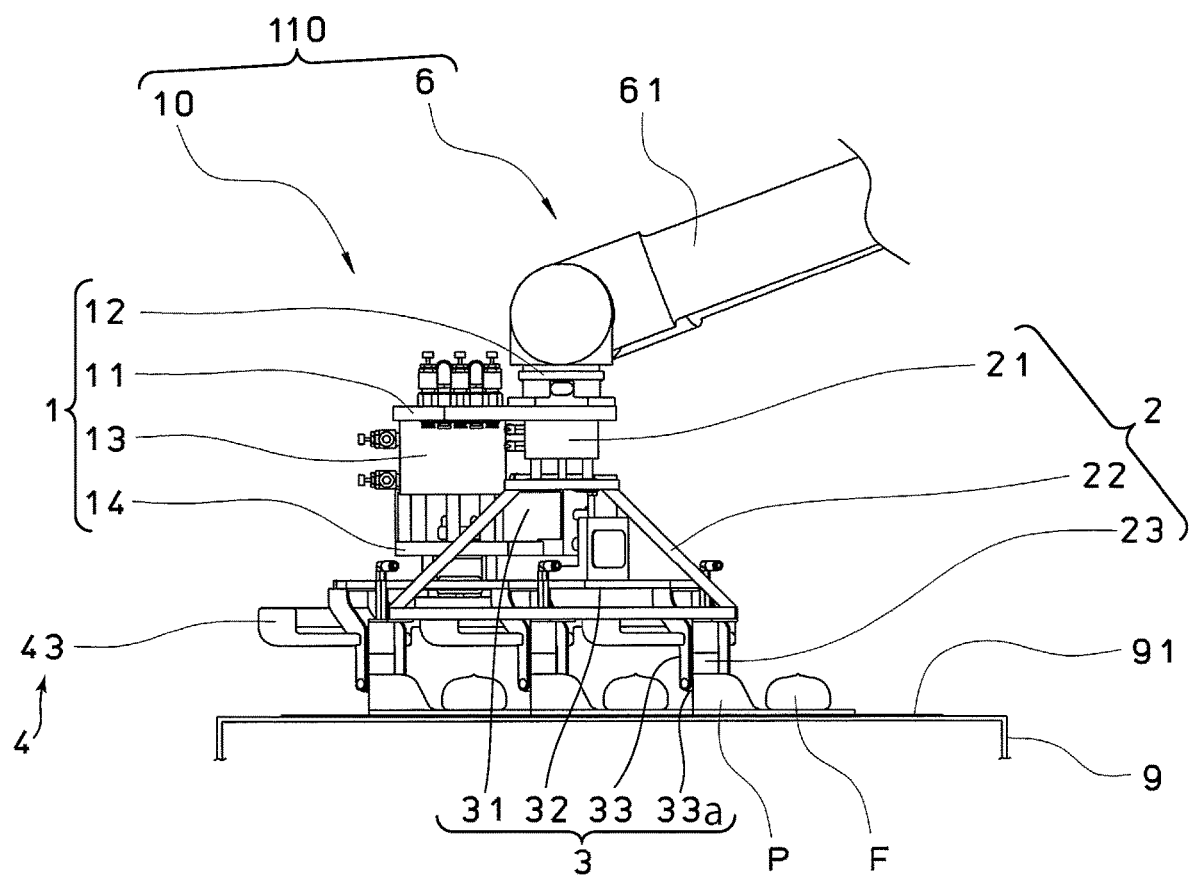
FIG. 3 is a front view of the forming system of FIG. 1 in the grasping sub-operation.

As shown in FIG. 1, the food product forming line 100 includes a conveying device 9, a dough supplying device 92 supplying a food dough sheet PS onto a conveying surface 91 of the conveying device 9, a dough cutting device 8 forming the dough pieces P by cutting the food dough sheet PS, an inner material discharging device 7 discharging inner materials F onto the dough pieces P, a forming system 110 folding the dough pieces P to enclose the inner materials F, and a controlling device 5 controlling a series of the above-stated devices and the forming system 110. The forming system 110 includes the forming device 10 and a moving mechanism moving the forming device 10. In the first embodiment, the moving mechanism is the robot 6 disposed near the conveying device 9. The forming device 10 is connected to the robot 6 as an end effector and suspended above the conveying device 9.

The conveying device 9 is a known belt conveyor and is configured so that the food dough sheet PS, which is supplied from the dough supplying device 92, is disposed on the conveying surface 91 and is conveyed toward a downstream side of the food product forming line 100. The dough supplying device 92 is a device having a known mechanism for forming a food dough into a sheet such as a dough extending device, which is described in the Patent Publication 3 of a patent application filed by the present applicant. In the description below, a direction of conveying, for example, the food dough sheet PS and the dough pieces P described below will be referred to as a "conveying direction X".

The dough cutting device 8 includes circular cutters 81 cutting the food dough sheet PS along the conveying direction X, and a guillotine-type cutter 82 cutting the food dough sheet PS, which has been cut along the conveying direction X, along a direction Y orthogonal to the conveying direction X, and namely, the dough cutting device 8 is configured to form (or cut) dough pieces P having a shape of an approximate square from the food dough sheet PS. Further, the dough cutting device 8 includes a signal transmitting section 83 transmitting an operation signal of the guillotine-type cutter 82 to the controlling device 5.

The inner material discharging device 7 is a known depositor disposed downstream of the dough cutting device 8 and upstream of the forming system 110 including the robot 6, and, for example, is a discharging device described in the Patent Publication 4 of a patent application filed by the present applicant. The inner material discharging device 7 can discharge a predetermined amount of the inner material F at a predetermined position on the dough piece P.

The robot 6 of the forming system 110 is disposed downstream of the inner material discharging device 7 and near the conveying device 9. The robot 6 is a known industrial multi-joint robot and has an arm 61 which is movable in horizontal directions X, Y and an up-down direction Z. The forming device 10 is also movable in the horizontal directions X, Y and the up-down direction Z above the conveying device 9 as it is connected to a tip of the arm 61.

As shown in FIGS. 2-5, the forming device 10 includes a carrier 1, an upper jaw unit 2, a lower jaw unit 3, and a pressing unit 4. The carrier 1 includes an upper jaw base 11, a connecting portion 12 provided on un upper surface of the upper jaw base 11, a first air cylinder 13 provided on a lower surface of the upper jaw base 11 and being extendable in the up-down direction, and a lower jaw base 14 attached to a tip of a rod of the first air cylinder 13. The forming device 10 is connected to the arm 61 of the robot 6 via the connecting portion 12. The lower jaw base 14 is configured to be moved with respect to the upper jaw base 11 in the up-down direction by extending and contracting the rod of the first air cylinder 13 in the up-down direction.

The upper jaw unit 2 includes a third air cylinder 21 attached to the lower surface of the upper jaw base 11 of the carrier 1 and being extendable in the up-down direction, an upper jaw frame 22 fixed to a tip of a rod of the third air cylinder 21, suction tools 23 attached to the upper jaw frame 22 to face the conveying surface 91. Thus, the suction tools 23 are configured to be moved with respect to the upper jaw base 11 in the up-down direction by using the third air cylinder 21 to move the upper jaw frame 22 in the up-down direction. Each of the suction tools 23 in the first embodiment is a non-contact chuck, which is configured to be able to hold the dough piece P in a non-contact way by radially emitting compression air from a peripheral edge of a tip of the suction tool to cause a negative pressure at the center of the tip. The number of the suction tools 23 is defined depending on the number of the lines of the dough pieces P, and in the present embodiment, the number of the suction tools 23 is three because the three-lined dough pieces P are supplied. The structure and the functions of each of the suction tools 23 are the same as each other, and thus, these suction tools 23 will be explained below so that each of the suction tools 23 is not distinguished from the others.

The lower jaw unit 3 includes a second air cylinder 31 attached to the lower jaw base 14 and being extendable obliquely in the horizontal direction, an attachment base 32 attached to a tip of a rod of the second air cylinder 31, and supporting tools 33 attached to a lower surface of the attachment base 32. The lower jaw unit 3 can be moved with respect to the upper jaw base 11 in the up-down direction by extending and contracting the first air cylinder 13 of the carrier 1 in the up-down direction. The supporting tool 33 can be moved from a location far from the suction tool 23 to a location near the suction tool 23 by extending and contracting the second air cylinder 31 substantially parallel to the conveying surface 91 to move the attachment base 32 substantially parallel to the conveying surface 91. Each of the supporting tools 33 includes a supporting part 33a holding the dough piece P together with the suction tool 23, and the supporting part 33a is a free roller. The number of the free rollers 33a is defined depending on the number of the suction tools 23, and it is three in the first embodiment. The structure and the functions of each of the supporting tools 33 are the same, and thus, these supporting tools 33 will be explained below so that each of the supporting tools 33 is not distinguished from the others. A rotational axis of the free roller 33a is arranged approximately parallel to the conveying surface 91 and approximately diagonal to the extendable direction of the second air cylinder 31. Further, to prevent the supporting tool 33 from interfering with the conveying surface 91 when the suction tool 23 suctions the dough piece P, the lowest position of the supporting tool 33 is defined to be higher than the lowest position of the suction tool 23 in a state in which the first air cylinder 13 and the third air cylinder 21 are contracted (retracted) (see FIGS. 3 and 6A-6C).

Figure 4:
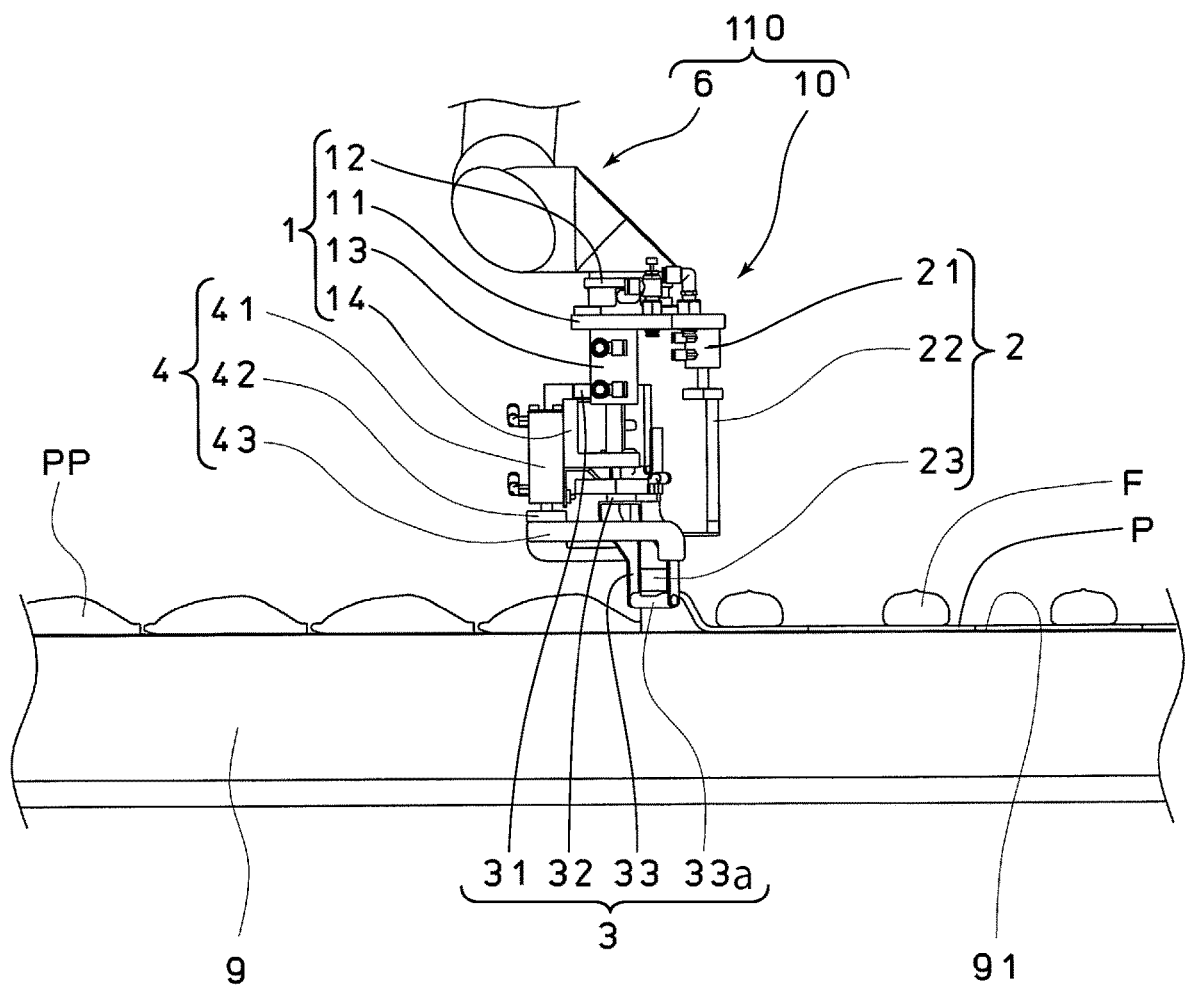
FIG. 4 is a side view of the forming system of FIG. 1 in the grasping sub-operation.
Figure 6A:
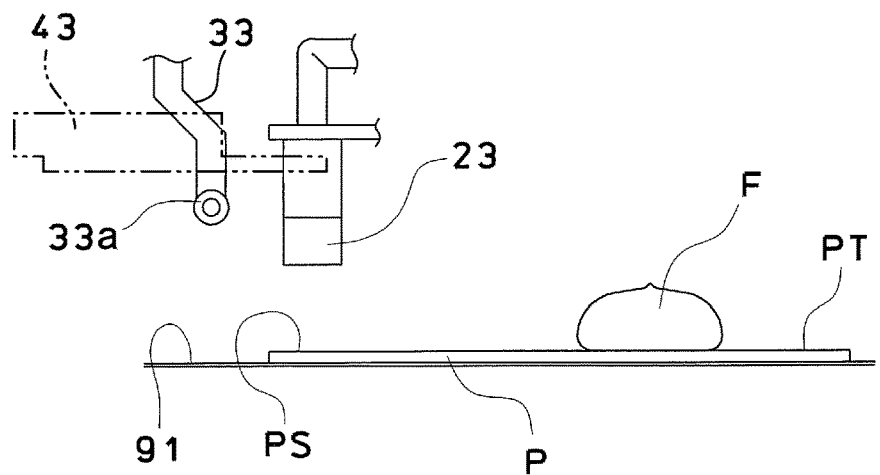
FIG. 6A is an illustrative view of a part of the folding operation according to the forming system of FIG. 1.
Figure 6B:
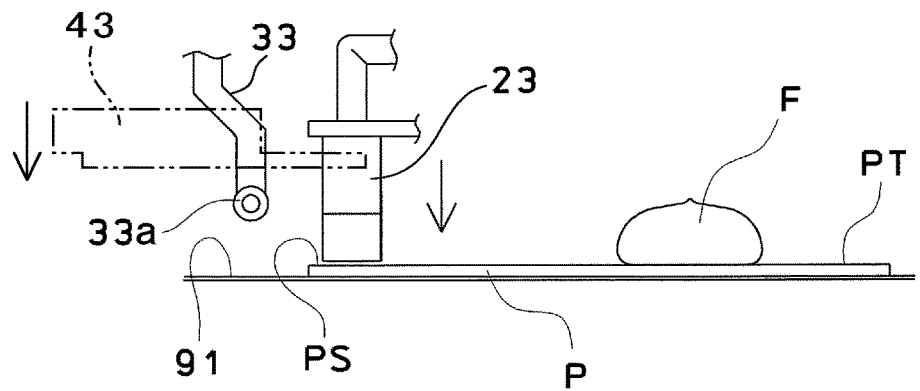
FIG. 6B is an illustrative view of a part of the folding operation according to the forming system of FIG. 1.
Figure 6C:
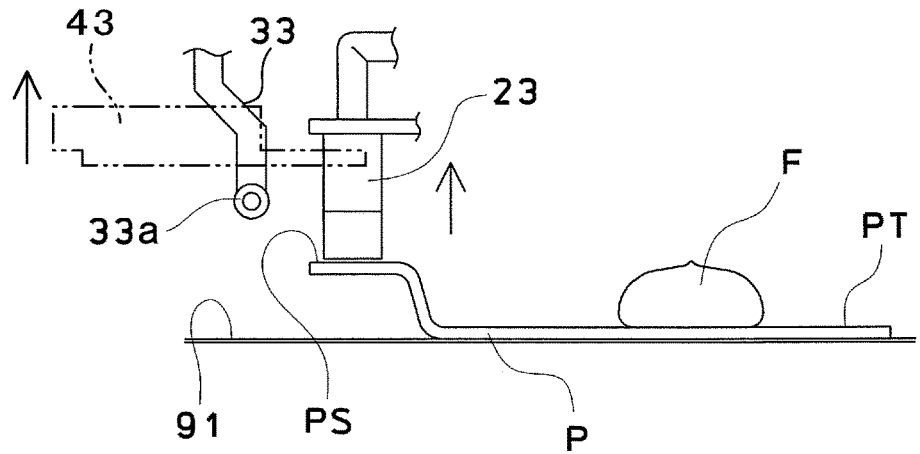
FIG. 6C is an illustrative view of a part of the folding operation according to the forming system of FIG. 1.
Figure 6D:
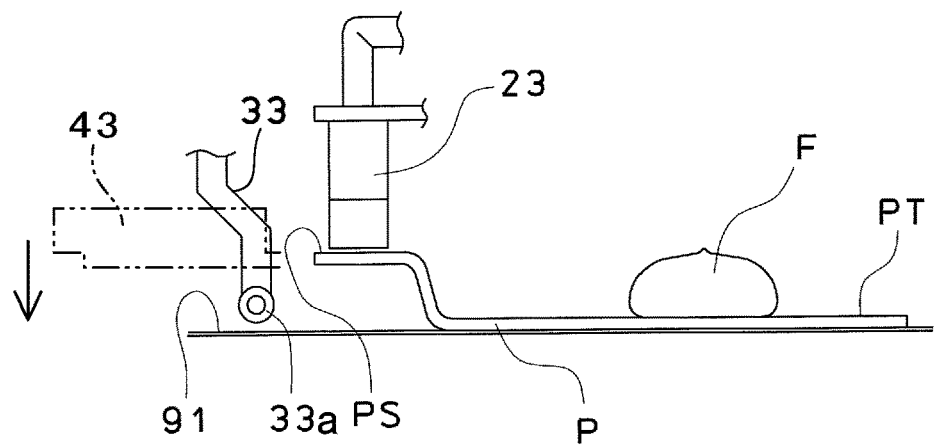
FIG. 6D is an illustrative view of a part of the folding operation according to the forming system of FIG. 1.
Figure 6E:
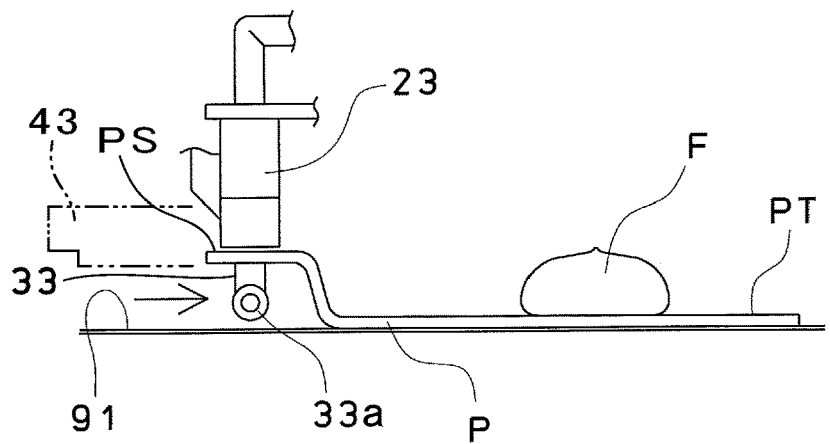
FIG. 6E is an illustrative view of a part of the folding operation according to the forming system of FIG. 1.
Figure 6F:
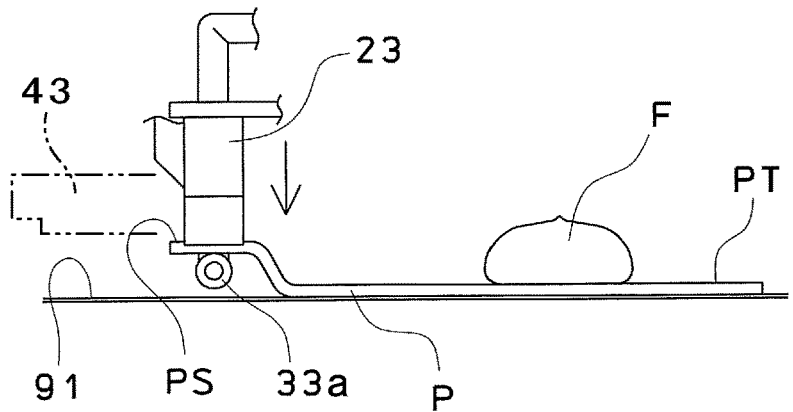
FIG. 6F is an illustrative view of a part of the folding operation according to the forming system of FIG. 1.
Figure 6G:
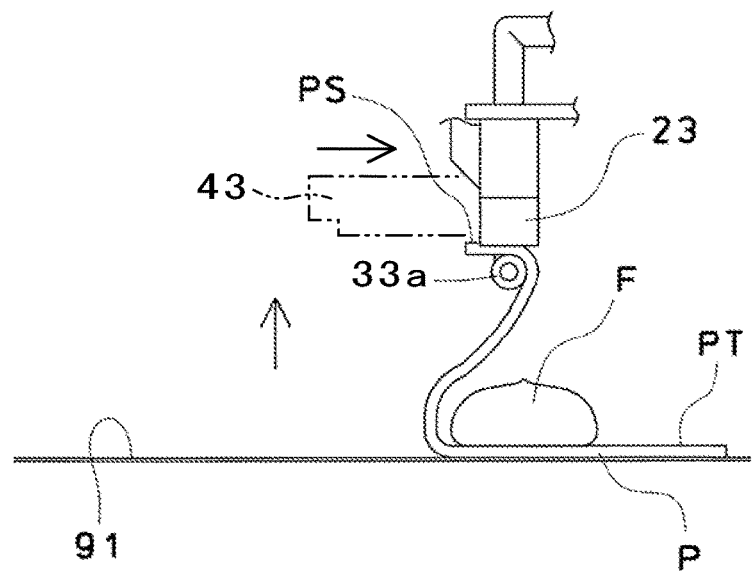
FIG. 6G is an illustrative view of a part of the folding operation according to the forming system of FIG. 1.
Figure 6H:
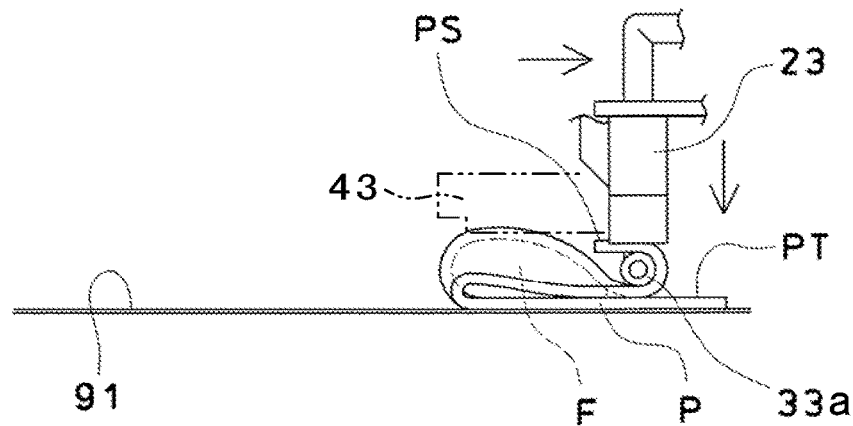
FIG. 6H is an illustrative view of a part of the folding operation according to the forming system of FIG. 1.
Figure 6I:
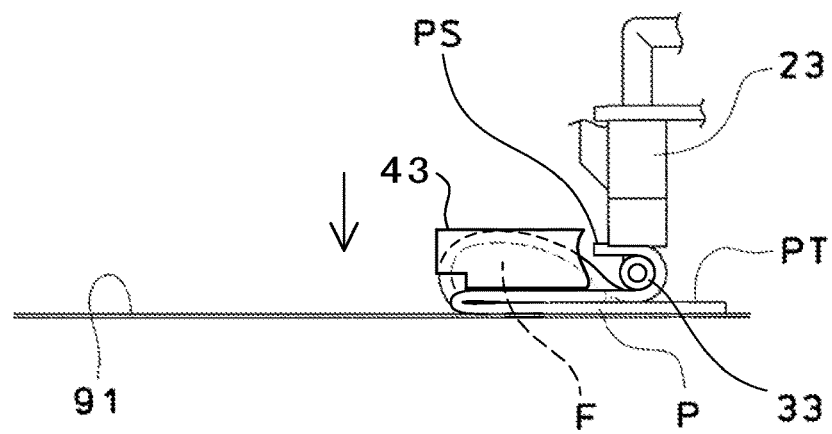
FIG. 6I is an illustrative view of a part of the folding operation according to the forming system of FIG. 1.

The pressing unit 4 includes a fourth air cylinder 41 attached to the lower jaw base 14 and being extendable in the up-down direction, a pressing base 42 attached to a tip of a rod of the fourth air cylinder 41, and a pressing tool 43 attached to a lower surface of the pressing base 42 (see FIG. 4). The pressing unit 4 can be moved together with the lower jaw unit 3 in the up-down direction by extending and contracting the first air cylinder 13 of the carrier 1. The pressing unit 4 is configured to sandwich edges of a folded and overlapped dough piece P between the pressing tool 43 and the conveying surface 91 to press the dough piece P toward the conveying surface 91 by extending the fourth air cylinder 41 to move the pressing tool 43 from its upper position to its lower position. In the first embodiment, the pressing tool 43 is shaped and arranged to press the edges of the two equal sides of the approximate isosceles right triangle of the folded food product PP. Further, to prevent the pressing tool 43 from interfering with the conveying surface 91 before the free roller 33a of the supporting tool 33 enters below the dough piece P held by the suction tool 23, the lowest position of the pressing tool 43 is defined to be higher than the lowest position of the supporting tool 33 in a state in which the fourth air cylinder 41 is contracted (retracted) (see FIG. 6D).

As shown in FIG. 1, the controlling device 5 includes a storing section 51, a calculating section 52, and a control section 53. The storing section 51 is configured to store basic programs of the forming device 10, data of products to be formed (such as sizes of the products and conveying speeds), motions of the arm 61 corresponding to the data of the products, and settings of, for example, operating timings of each of the air cylinders. The calculating section 52 is configured to refer to the information stored in the storing section 51, produce control instructions, and output the control instructions to the control section 53 when the calculating section 52 receives an operation signal transmitted from the signal transmitting section 83 of the guillotine-type cutter 82. The control section 53 is configured to operate the arm 61, the first air cylinder 13, the second air cylinder 31, the third air cylinder 21, and the fourth air cylinder 41 according to the control instructions.

Next, referring to the FIGS. 1 and 6A-6I, an operation of the food product forming line 100 including the forming system 110 according to the present invention will be explained. The dough piece P is, for example, a piece of dough for a Danish pastry in which bread dough layers and fat layers are laminated. The dough piece P has a flat shape of an approximate square, a length of each of the sides (for example, twelve centimeters), and a thickness (for example, five millimeters). Hereinafter, regarding the dough piece P shown in FIGS. 2 and 5, the downstream side is referred to as the side PD, the upstream side is referred to as the side PU, and the right side and the left side when viewing in the conveying direction X are referred to as the side PR and the side PL, respectively. Further, when viewing in the conveying direction X, the downstream left corner (or the corner between the side PD and the side PL) is referred to as the corner DL, the downstream right corner (or the corner between the side PD and the side PR) is referred to as the corner DR, the upstream right corner (or the corner between the side PU and the side PR) is referred to as the corner UR, and the upstream left corner (or the corner between the side PU and the side PL) is referred to as the corner UL. The inner material F is, for example, custard cream.

In the first embodiment, by overlapping the corner DL onto the corner UR of the dough piece P on which the inner material F is deposited, the folded food product PP which encloses the inner material F and has a shape of the approximate isosceles right triangle is formed. Further, in the first embodiment, the dough pieces P are supplied to the forming system 110 in three lines, and then formed. The dough pieces P have the same size in all of the lines, and the same folding operations are performed to the dough pieces P in all of the lines. In this connection, an individual dough piece P will not be distinguished from the others to avoid cumbersome explanations, reference numbers are attached to only one of the dough pieces P, and any one of the dough pieces P will be exemplarily explained.

A food dough sheet PS, which is supplied from the dough supplying device 92, is conveyed by the conveying device 9, firstly cut into three lines along the conveying direction X by the circular cutters 81, and secondly cut along a direction Y perpendicular to the conveying direction X by the guillotine-type cutter 82. This makes the dough pieces P with the predetermined size. The signal transmitting section 83 transmits an operation signal to the calculating section 52 at every one cut by the guillotine-type cutter 82. The dough pieces P are tightly arranged on the conveying surface 91 of the conveying device 9 and conveyed continuously in the conveying direction X. Further, fluid (such as water) for facilitating bonding of doughs is preferably applied to the peripheral portions of the dough piece P. This application may be performed by a known device, such as a dripping device or a spray nozzle, and the application may be performed before the dough piece P is formed, but after the food dough sheet PS is cut, or after the dough piece P is formed.

The inner material F is discharged onto an upper surface of the dough piece P by using the inner material discharging device 7. It is preferable that an appropriate amount of the inner material F is discharged onto the diagonal line between the corner DL and the corner UR and at a midpoint between the center and the corner UR of the dough piece P so that the inner material F is prevented from overflowing from the dough piece P in the folding operation. The inner material discharging device 7 may be operated at any timings regardless of the dough cutting device 8 or the forming device 10, or operated at timings based on the operation signals transmitted from the signal transmitting section 83 of the guillotine-type cutter 82. Further, the inner material F may be another food, such as jam or meat source, or a combination of such food with a solid material, such as fruit or egg. The dough piece P with the discharged inner material F is further conveyed in the conveying direction X.

Next, a folding operation of folding the dough piece P is performed by using the forming system 110. In the first embodiment, the corner DL (also referred to as "the one end PS" hereinafter) of the dough piece P is moved along the diagonal line between the corner DL and the corner UR to be put onto the corner UR (also referred to as "the other end PT" hereinafter). At the start of the folding operation, the first air cylinder 13, the second air cylinder 31, the third air cylinder 21, and the fourth air cylinder 41 of the forming device 10 are in their contracted position (retracted position).

When the calculating section 52 receives an operation signal from the guillotine-type cutter 82, the calculating section 52 refers to the data of the product (such as the product size and the conveying speed) stored in the storing section 51, produces the control instructions for performing the folding operation by the forming system 110, and outputs the control instructions to the control section 53. The control section 53 submits operation signals to the robot 6 and each portion of the forming device 10 based on the control instructions to perform the folding operation.

An alignment sub-operation of aligning the forming device 10 with the dough piece P is performed. Concretely, the forming device 10 is moved to an initial position where the suction tool 23 is located above the one end PS (the corner DL) of the dough piece P (see FIG. 6A) by using the robot 6. Further, since the dough piece P is continuously conveyed in the conveying direction X by the conveying device 9, the forming device 10 is configured to follow the dough piece P at the same speed as the conveying device 9 to prevent the suction tool 23 from misaligning from the location above the one end PS. This following action may be performed by transmitting information obtained from an encoder provided in the conveying device 9 to the calculating section 52 or otherwise. Each of the sub-operations in the folding operation is performed while the above-stated following action is performed, although this will not be especially described.

After the alignment sub-operation, a lifting sub-operation of lifting or picking up the one end PS of the dough piece P is performed. Concretely, the forming device 10 is entirely lowered by using the robot 6 to bring the suction tool 23 closer to the one end PS (see FIG. 6B). Next, compressed air is radially emitted from a peripheral edge of a tip of the suction tool 23 to cause a negative pressure approximately at the center of the tip so that the suction tool 23 holds the one end PS in a non-contact way while it suctions the one end PS from its upside. Next, the forming device 10 is entirely raised by the robot 6 to lift the one end PS of the dough piece P from the conveying surface 91 while the one end PS is held in the non-contact way by the suction tool 23. Then, a clearance is caused between the one end PS and the conveying surface 91 (see FIG. 6C).

After the lifting sub-operation, a grasping sub-operation of grasping the one end PS of the dough piece P is performed by the upper jaw unit 2 and the lower jaw unit 3 of the forming device 10. Concretely, the first air cylinder 13 is extended to lower the lower jaw base 14 with respect to the upper jaw base 11 so that the supporting tool 33 is lowered with respect to the suction tool 23 (see FIG. 6D). A distance of lowering the lower jaw base 14 is previously determined so that a height of the free roller 33a of the supporting tool 33 at that time is within a range of the clearance between the one end PS and the conveying surface 91. Next, the second air cylinder 31 is extended to move the supporting tool 33, which is attached to the attachment base 32, substantially parallel to the conveying surface 91 so that the free roller 33a of the supporting tool 33 is moved below the one end PS suctioned by the suction tool 23 (see FIG. 6E). After the free roller 33a is moved just below the suction tool 23, the third air cylinder 21 is extended to move the suction tool 23, which is attached to the upper jaw frame 22, downwardly with respect to the supporting tool 33 and bring the suction tool 23 and the supporting tool 33 closer to each other so that the one end PS of the dough piece P is sandwiched between the free roller 33*a* and the suction tool 23 to grasp the one end PS (see FIG. 6F). After that, since suctioning the dough piece PS by the suction tool 23 is not necessary, emitting the compressed air from the suction tool 23 is stopped.

After the grasping sub-operation, an overlapping sub-operation of the dough piece P is performed. Concretely, the forming device 10 is entirely moved toward the corner UR along the diagonal line between the corner DL and the corner UR by using the robot 6. Control instructions for moving the forming device 10 by the robot 6 are defined by inputting coordinates in the X, Y and Z directions to the storing section 51. A moving trajectory in the up-down direction Z of the forming device 10 is preferably along an upward-convex curve so that the grasped one end PS is prevented from contacting the inner material F. Moving the forming device 10 brings the one end PS grasped between the free roller 33*a* and the suction tool 23 closer to the other end PT (see FIG. 6G) and gradually folds the dough piece P to the diagonal line (or folding line) between the corner DR and the corner UL so that the inner material F is enclosed by the dough piece P. When the dough piece P has been folded into the approximate triangle, moving the forming device 10 by the robot 6 with respect to the dough piece P is stopped (while the above-stated following action is continued). At this moment, a portion of the dough piece P located under the free roller 33*a* contacts a portion of the dough piece P on the conveying surface 91. The dough piece P, except for the grasped one end PS and the other end PT on the conveying surface 91, has been folded along the diagonal line (or folding line) between the corner DR and the corner UL and thus, overlapped (see FIG. 6H).

After the overlapping sub-operation of the dough piece P, a pressing sub-operation of pressing the peripheral portions of the dough piece P is performed. Concretely, the fourth air cylinder 41 is extended to lower the pressing tool 43, which is attached to the pressing base 42, with respect to the suction tool 23 and the supporting tool 33 so that the peripheral portions along the sides PD, PR and the sides PL, PU of the folded dough piece P are pressed. Namely, the overlapped peripheral portions of the dough piece P are pressed between the pressing tool 43 and the conveying surface 91 (see FIG. 6I). After that, the fourth air cylinder 41 is contracted (retracted) to raise the pressing tool 43 with respect to the suction tool 23 and the supporting tool 33. The pressing tool 43 is shaped so that it prevents from interfering with the still grasped one end PS and the other end PT, and the pressing tool 43 is disposed so that it prevents from interfering with the suction tool 23 and the supporting tool 33.

Figure 6J:
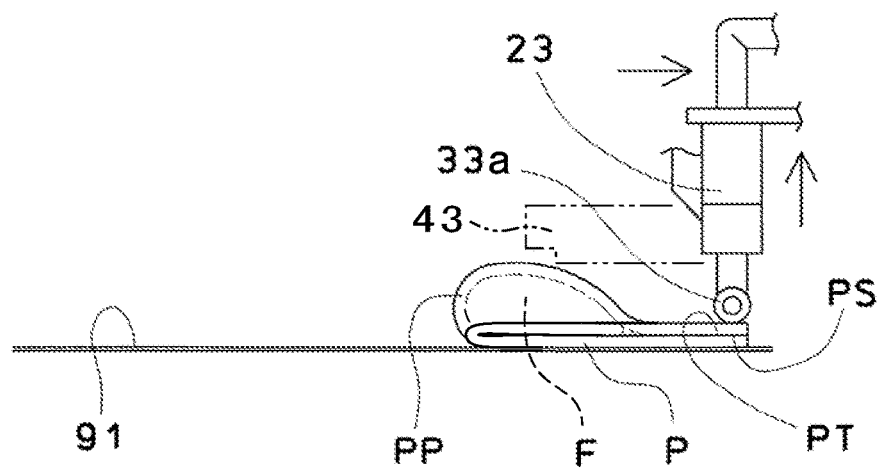
FIG. 6J is an illustrative view of a part of the folding operation according to the forming system of FIG. 1.

After the pressing sub-operation of the peripheral portions of the dough piece P, a bonding sub-operation of bonding the one end PS (the corner DL) with the other end PT (the corner UR) of the dough piece P is performed. Concretely, the third air cylinder 21 is contracted to raise the suction tool 23 attached to the upper jaw frame 22 so that the grasped one end PS is released. After that, the forming device 10 is entirely moved toward the other end PT (the corner UR) parallel to the conveying surface 91 by using the robot 6. Then, the free roller 33*a* of the supporting tool 33 allows the released one end PS to overlap onto the other end PT on the conveying surface 91 and rolls on and presses the one end PS so that the one end PS and the other end PT are bonded with each other (see FIG. 6J). Thus, the folded food product PP has been formed.

After the folded food product PP has been formed, to use the next-row dough pieces P to form the folded food products PP, the above-stated following action of the robot 6 is stopped and each of the sub-operations of the folding operation for the next-row dough pieces P is subsequently performed. Namely, the aligning sub-operation of aligning the forming device 10 with the next-row dough pieces P and the subsequent sub-operations are performed by the control instructions of the control section 53. Further, the folded food products PP are conveyed toward the downstream side to perform, for example, a baking process or a freezing process of the folded food products PP.

Although the first embodiment of the forming system and the forming device according to the present invention has been explained until now, the present invention is not limited to the first embodiment. For example, modifications according to shapes of desired folded food products PP can be made. For example, the movements of the arm 61 in the X, Y and Z directions can be modified according to a desired folding operation. Further, the pressing tool 43 may be shaped to correspond to the peripheral portions of a dough piece P to be folded. The lower surface of the pressing tool 43 (or the surface contacting the dough piece P) may be inclined or may have a step. This allows an extent of the bonding of the peripheral portions of the folded food product PP to be adjusted. For example, if the lower surface of the pressing tool 43 which presses the peripheral portions of the dough piece P is inclined to protrude downwardly from an inner side toward the peripheral side, in the pressing sub-operation, the peripheral portions of the folded dough piece P are surely bonded to prevent the inner material F from overflowing and the folded food product PP having a shape gradually raising from the peripheral side can be obtained.

FIG. 7 shows a forming device 101 which is an alternative of the first embodiment according to the present invention. The same references as those in the first embodiment are attached to portions of the dough piece and components which have the same effects as those in the first embodiment, and their explanations are omitted. The forming device 101 and a forming system 111 are configured to form a folded food product PP having a shape of an approximate rectangle from a dough piece P having a shape of an approximate square. A folding operation is performed so that the dough piece P is folded along a line segment (or folding line) between the midpoint of the side PR and the midpoint of the side PL to overlap the side PD onto the side PU. Namely, the corner DR is overlapped onto the corner UR, while the corner DL is overlapped onto the corner UL. Further, the folded food product PP has a grooved pattern along its peripheral portions. In the description below regarding the dough piece P, the vicinity of the side PD is referred to as a side PDD (or one end PDD of the dough piece P), and the side PU is referred to as a side PUU (or the other end PUU of the dough piece P).

A pressing tool 431 has a shape of an approximate character C in the plan view according to the shape of the folded food product PP, and a lower surface of the pressing tool 431 has concavities and convexities to form the grooved pattern. Tb prevent the pressing tool 431 from interfering with a supporting tool 331, the supporting tool 331 is disposed in an opening of the character C (upstream side in FIG. 7). The supporting tool 331 includes a free roller 331*a*, and the free roller 331*a* is configured to enter a clearance caused between the one end PDD lifted by the suction tool 23 and the conveying surface 91. Further, the peripheral surface of the free roller 331*a* has grooved concavities and convexities as the pressing tool 431. To lift the one end PDD of the one dough piece P, the three suction tools 23 are arranged along the direction Y (not shown).

An operation of the forming device 101 will be explained. The forming device 101 is moved to an initial position where the suction tool 23 is located above the one end of the dough piece P (the side PDD of the dough piece P1) by using the robot 6 (alignment sub-operation). After that, the forming device 101 is entirely lowered by using the robot 6 to suction the one end PDD by the suction tool 23 from its upside so that the one end PDD is held in the non-contact way. Next, the forming device 101 is entirely raised by using the robot 6 to lift the one end PDD from the conveying surface 91. Then, a clearance is caused between the one end PDD and the conveying surface 91 (lifting sub-operation). After the first air cylinder 13 is extended to lower the supporting tool 331 with respect to the suction tool 23, the second air cylinder 31 of the lower jaw unit 3 is extended to move the free roller 331a of the supporting tool 331 of the lower jaw unit 3 between the one end PDD and the conveying surface 91. The third air cylinder 21 is extended to lower the suction tool 23 with respect to the supporting tool 331 so that the one end PDD is sandwiched and grasped between the free roller 331a and the suction tool 23 (grasping sub-operation).

Next, the forming device 101 is entirely moved toward the upstream side in the direction X by using the robot 6 so that the one end PDD grasped by the forming device 101 is brought closer to the other end PUU and the dough piece P is gradually folded to a line segment (or folding line) between the midpoint of the side PR and the midpoint of the side PL, namely, folded in half. When the dough piece P has been folded into the shape of the approximate rectangle, moving the forming device 101 by the robot 6 with respect to the dough piece P is stopped (while the above-stated following action is continued) (overlapping sub-operation).

Next, the fourth air cylinder 41 is extended to lower the pressing tool 431 of the pressing unit 4 with respect to the suction tool 23 and the supporting tool 331 so that the peripheral portions of the folded dough piece P is pressed (pressing sub-operation). At this moment, since the lower surface of the pressing tool 431 has the grooved concavities and convexities, the grooved pattern is applied to the peripheral portions of the dough piece P.

Next, suctioning the one end PDD by the suction tool 23 is cancelled or stopped and the third air cylinder 21 is contracted to raise the suction tool 23 so that the grasped one end PDD is released. After that, the forming device 101 is entirely moved toward the upstream side by using the robot 6. Then, the free roller 331a of the supporting tool 331 allows the one end PDD to overlap onto the other end PUU, and rolls on the one end PDD toward the upstream side to press the one end PDD so that the one end PDD and the other end PUU are bonded with each other. Further, since the peripheral surface of the free roller 331a is provided with the grooves, the grooved pattern is applied to the peripheral portions of the dough piece P (bonding sub-operation).

Figure 8:
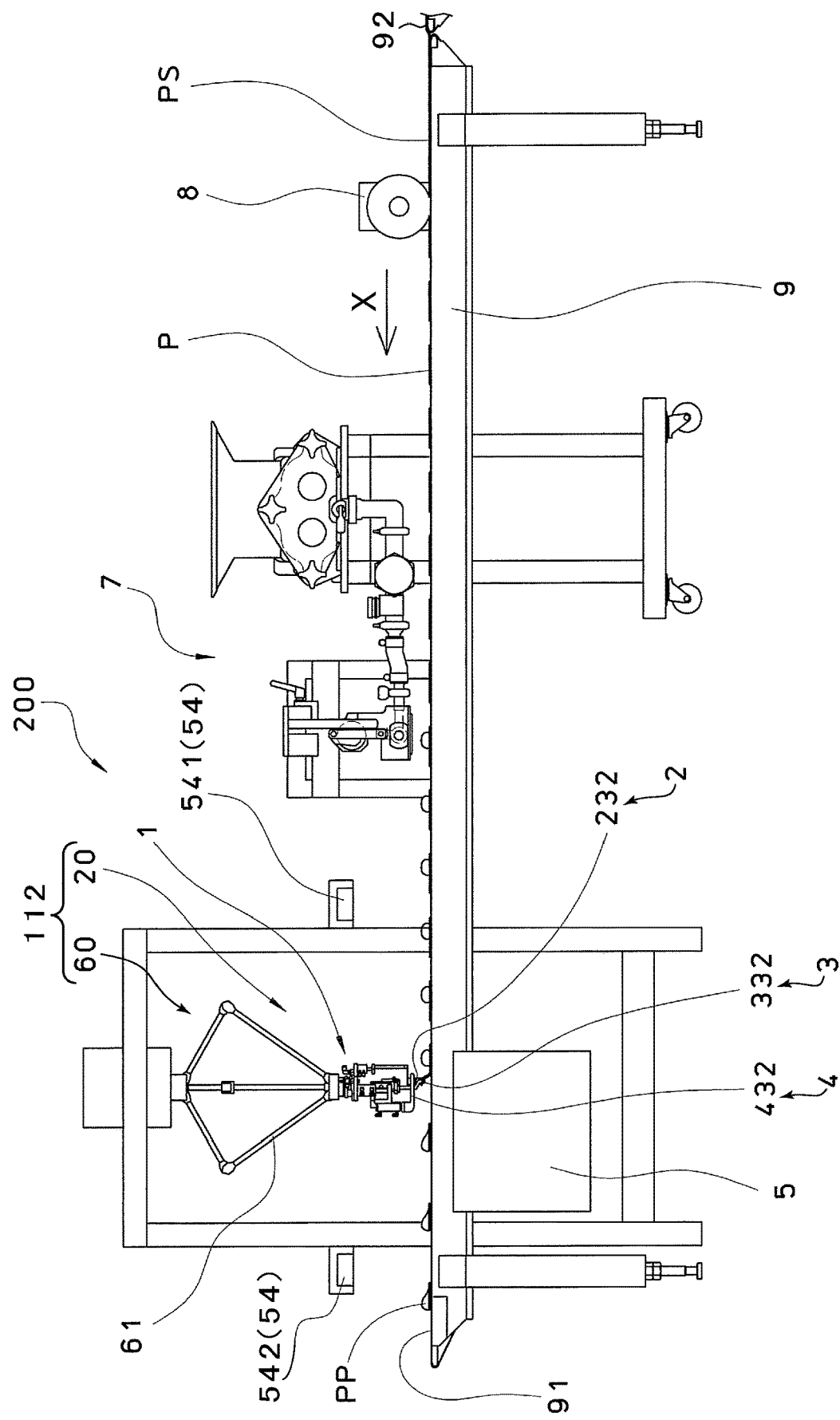
FIG. 8 is a schematical side view of a food producing line which uses a second embodiment of the forming system according to the present invention.
Figure 9:
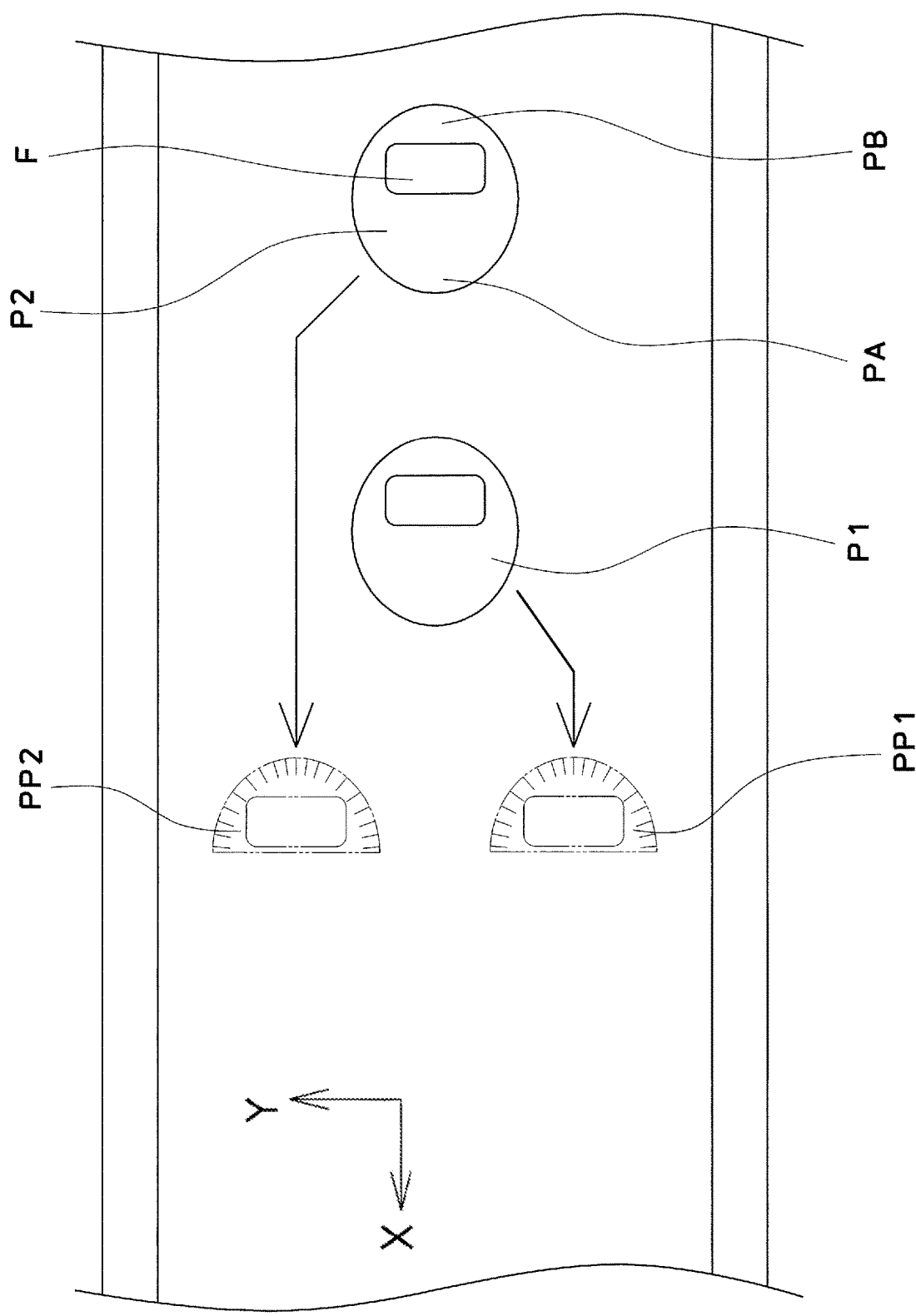
FIG. 9 is an illustrative view of a part of a folding operation according to the forming system of FIG. 8.

Referring to FIGS. 8 and 9, a second embodiment of a forming system and a forming device according to the present invention will be explained. Briefly, a forming device 20 of the second embodiment is configured as an end effector for a robot which is included in a food product forming line 200. The food product forming line 200 includes the conveying device 9, the dough supplying device 92, a dough cutting device 8, the inner material discharging device 7, a forming system 112, and a controlling device 5. The forming system 112 includes the forming device 20 and a moving mechanism for moving the forming device 20. In the second embodiment, the moving mechanism is a robot 60 suspended above the conveying device 9. The forming device 20 is connected to the robot 60 as an end effector and suspended above the conveying device 9. The robot 60 is a known parallel-link robot and has an arm 61 which is movable in the horizontal directions X, Y and the up-down direction Z. The forming device 20 is connected to a tip of the arm 61. In the second embodiment, by folding a flat dough piece P having a shape of an approximate circle in half, a folded food product PP having a shape of an approximately semicircle and grooved patterns on an end of this shape is formed. Further, in the second embodiment, the forming system 112 is configured so that the folding operation is performed at the same time the continuously supplied dough pieces P1, P2, P3, . . . are arranged. The same references as those in the first embodiment are attached to portions of the dough piece and components which have effects similar to those in the first embodiment, and explanations of these portions and components are omitted.

The forming device 20 includes the carrier 1, an upper jaw unit 2, a lower jaw unit 3, and a pressing unit 4. The upper jaw unit 2 includes a suction tool 232 attached to the upper jaw frame 22. The lower jaw unit 3 includes a supporting tool 332 attached to the lower surface of the attachment base 32. In the second embodiment, the number of the suction tools 232 is one and accordingly, the number of the supporting tool 332 is also one. The suction tool 232 is a known vacuum pad and is configured to suction and catch the dough piece P to hold it. The supporting tool 332 includes a supporting part 332a for holding the dough piece, such as the dough piece P1, together with the suction tool 232, and the supporting part 332a is a free roller. The free roller 332a has a peripheral surface having grooved concavities and convexities. The pressing unit 4 includes a pressing tool 432 attached to the lower surface of the pressing base 42. The pressing tool 432 has a shape of an arc according to the shape of the folded food product PP to be formed so that the edge portions of the folded product PP having the shape of the approximate semicircle in the plan view are pressed, and a lower surface of the pressing tool 432 has grooved concavities and convexities corresponding to those of the free roller 332a of the supporting tool 332. To prevent the pressing tool 432 from interfering with the supporting tool 332, a portion of the semicircular arc of the pressing tool 432 is interrupted.

The controlling device 5 includes the storing section 51, a calculating section 52, the control section 53, and a detecting section 54. The detecting section 54 includes an upstream detecting element 541 disposed downstream of the robot 60 in the conveying direction and a downstream detecting element 542 disposed downstream of the robot 60 in the conveying direction. The upstream detecting element 541 is configured to transmit a detecting signal to the calculating section 52 when it detects the dough piece P. The calculating section 52 is configured to calculate a positional information of the dough piece P according to the detecting signal and information from an encoder of the conveying device 9, refer to the storing section 51, and output control instructions to the control section 53. The downstream detecting element 542 is configured to detect the folded food product PP, and transmit a detecting signal to the calculating section 52. The calculating section 52 is configured to correct the control instructions to be output to the control section 53 by referring to the positional information from the downstream detecting element 542.

In the second embodiment, the dough cutting device 8 is a rotary stamping cutter to form (cut and separate) dough pieces, such as the dough piece P1, from the dough sheet PS.

The dough pieces, for example, the dough piece P1, onto which the respective inner materials F are deposited, are aligned in one line along the conveying direction X and supplied to the forming system 112 one by one. According to operation signals, by using the robot 60, the forming device 20 is moved to an initial position where the suction tool 232 is located above the one end PA of the dough piece P1 (the downstream end of the circular periphery of the dough piece P1) (alignment sub-operation). Since the dough pieces P are continuously conveyed in the conveying direction X by the conveying device 9, the forming device 20 is allowed to follow the dough piece P1 at the same speed as that of the conveying device 9 so that the suction tool 232 is prevented from misaligning from the one end PA. Each of sub-operations in the folding operation is performed while this following action is performed, although this will not be especially explained.

Next, a folding operation of folding the dough piece P1 is performed by using the forming system 112. In the second embodiment, the downstream end PA of the circular periphery of the dough piece P1 (also referred to as "the one end PA" hereinafter) is moved in a direction opposite to the conveying direction X and is overlapped onto the upstream end PB of the circular periphery of the dough piece P1 (also referred to as "the other end PB" hereinafter).

The forming device 20 is entirely lowered by using the robot 60, and the one end PA is suctioned and held by the suction tool 232 from its upside. Next, the forming device 20 is entirely raised by using the robot 60 so that the one end PA is lifted from the conveying surface 91. Then, a clearance is caused between the one end PA and the conveying surface 91 (lifting sub-operation).

After the first air cylinder 13 is extended to lower the supporting tool 332 with respect to the suction tool 232, the second air cylinder 31 is extended to move the free roller 332a of the supporting tool 332 of the lower jaw unit 3 between the one end PA and the conveying surface 91. Next, the third air cylinder 21 is extended to move the suction tool 232 downwardly with respect to the supporting tool 332 so that the one end PA is sandwiched and grasped between the free roller 332a and the suction tool 232 (grasping sub-operation).

Next, in the second embodiment, the forming device 20 is entirely moved by using the robot 60 to entirely move the grasped dough piece P1. The control instructions (a target point, a passing point, or a trajectory) of moving the forming device 20 by the robot 60 are defined by previously inputting the coordinates in the X, Y, Z directions to the storing section 51. In the second embodiment, at the same time the dough piece, such as the dough piece P1, P2, . . . , grasped by the forming device 20 is moved on the conveying surface 91 toward the downstream side in the X direction (conveying direction), the dough pieces P are rearranged from one line to two lines. For example, the first dough piece P1 is shifted to a left position in the Y direction with respect to the center of the conveying surface 91 and the next dough piece P2 is shifted to a right position in the Y direction with respect to the center of the conveying surface 91 (see FIG. 9).

Next, the forming device 20 is entirely moved toward the upstream side in the X direction by using the robot 60 so that the one end PA grasped by the forming device 20 is brought closer to the other end PB and the dough piece P1 is gradually folded to a line segment (or a folding line) at its diameter in the Y direction, namely, the dough piece P1 is folded in half. When the dough piece P1 has been folded in the shape of the approximate semicircle, moving the forming device 20 with respect to the dough piece P1 by the robot 60 is stopped (the above-stated following action is continued) (overlapping sub-operation).

Next, the fourth air cylinder 41 is extended to lower the pressing tool 432 of the pressing unit 4 with respect to the suction tool 232 and the supporting tool 332 so that the peripheral portions of the folded dough piece P1 is pressed (pressing sub-operation). Then, since the lower surface of the pressing tool 432 has the grooved concavities and convexities, the grooved pattern is applied to the peripheral portions of the dough piece P1.

Next, suctioning and catching the one end PA by the suction tool 232 are cancelled or stopped and the third air cylinder 21 is contracted to raise the suction tool 232 so that the grasped one end PA is released. After that, the forming device 20 is entirely moved toward the upstream side by using the robot 60. Then, the free roller 332a of the supporting tool 332 allows the one end PA to overlap onto the other end PB and rolls on and presses the one end PA so that the one end PA and the other end PB are bonded with each other. Further, since the peripheral surface of the free roller 332a has the grooves, the grooved pattern is applied to the peripheral portions of the dough piece P1 (bonding sub-operation). Thus, the folded food product PP1 has been formed.

After the folded food product PP1 has been formed, to form a folded food product PP2 by using the next-row dough piece P2, the above-stated following action of the robot 60 is stopped and each of the sub-operations of the folding operation for the next-row dough piece P2 is subsequently performed. The folding operation of the dough piece P2 may be started with a signal from the upstream detecting element 541, or may be continuously performed by previously inputting the coordinates and a time period to the storing section 51 in case a distance between the dough piece P1 and the dough piece P2 is fixed.

The folding operation of the dough piece P2 is similar to the folding operation of the dough piece P1. When the dough piece P2 is shifted toward the right side in the Y direction with respect to the center of the conveying surface 91, preferably, the forming device 20 is entirely moved by using the robot 60 so that the grasped dough piece P2 is aligned with the folded food product PP1 along the Y direction. The target location and trajectory of this movement are defined by inputting their coordinates in the X, Y directions to the storing section 51. After the movement of the forming device 20 is stopped, the overlapping sub-operation of the dough piece P2 is performed to form the folded food product PP2, as the dough piece P1.

After the folded food products PP1, PP2 are aligned with each other along the Y direction, the forming device 20 is moved to the initial position for the next-row dough piece P3 by using the robot 60. On the other hand, the downstream detecting element 542 detects the positional information of the folded food products PP1, PP2 and outputs the positional information to the calculating section 52. The calculating section 52 corrects the control instructions to be output to the control section 53 by referring to the positional information. For example, when the folded food product PP2 is actually shifted toward the downstream side in the X direction with respect to the folded food product PP1, in the folding operations of the subsequent dough pieces P3, P4, the coordinate in the X direction of the target location when the dough piece P4 is moved is corrected toward the upstream side. This correction may be performed line by line or row by row. Further, when the downstream detecting element 542 is an image sensor, a misalignment of the overlapping of the folded food product may be corrected.

In the first and second embodiments, since the forming device is moved by the robot according to the determined moving distances in the X, Y and Z directions previously input to the storing section, the moving trajectory of the forming device may be more complicated. For example, the moving trajectory can be set so that the inner material is prevented from adhering the forming device or an overlapping surface of the dough piece according to an amount and a shape retaining property of the inner material F. Further, such a moving trajectory allows the dough piece to be folded so that the inner material prevents from overflowing. Further, it is preferable that the overlapping sub-operation is finely adjusted according to variation of a thickness of the dough piece derived from its property and state to stabilize the shapes of the folded food products to be obtained. Further, an amount and a direction of the overlapping of the dough piece can be adjusted according to the desired folded food product.

Figure 10:
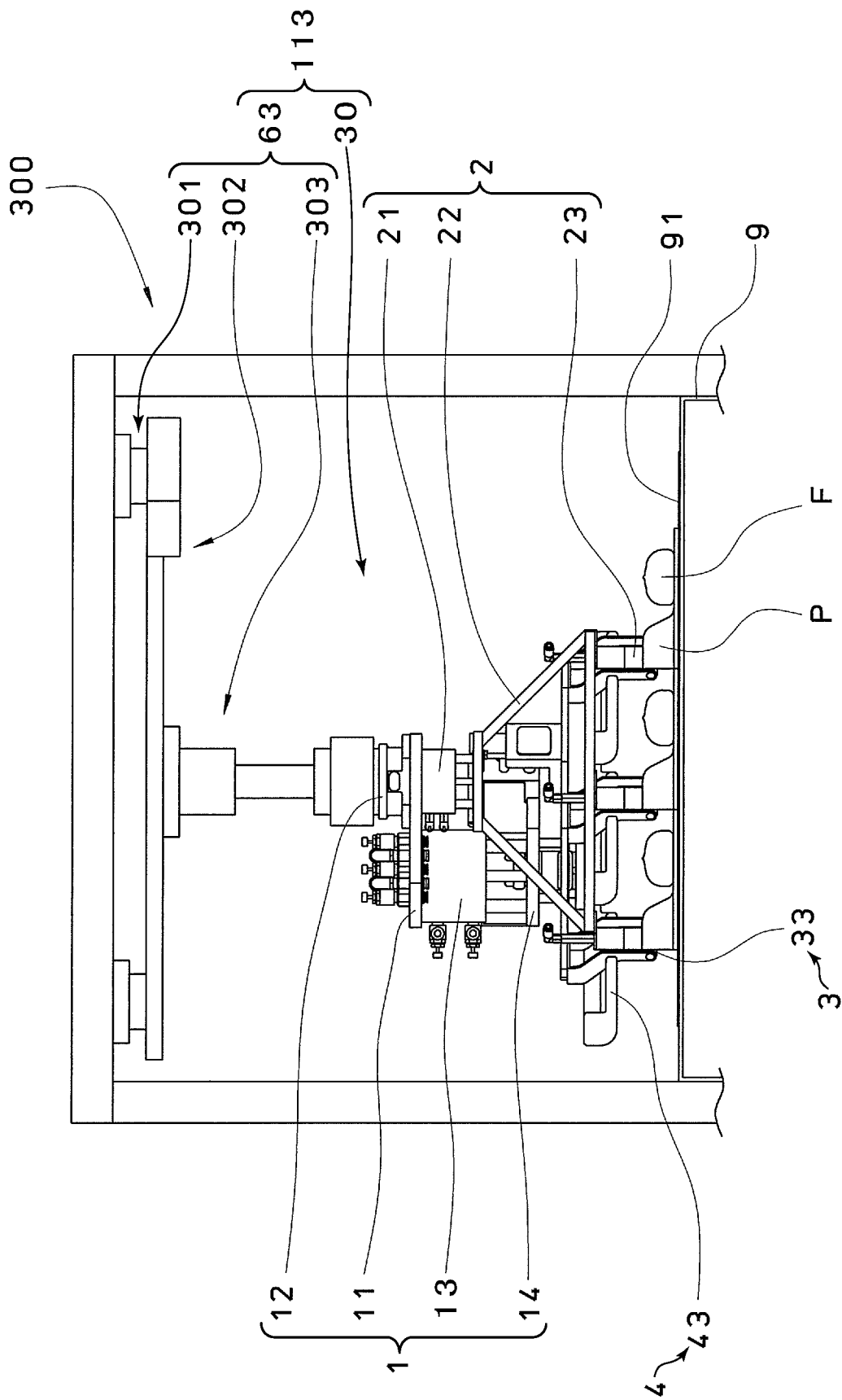
FIG. 10 is a front view of a third embodiment of the forming system according to the present invention.

Next, referring to FIG. 10, a third embodiment of a forming system and a forming device according to the present invention will be explained. In the third embodiment, a folded food product PP having a shape of an approximate isosceles right triangle is formed by folding a dough piece P having a shape of an approximate square along its diagonal line (or a folding line), as the first embodiment. The same references as those in the first embodiment are attached to portions of the dough piece and components which have effects similar to those in the first embodiment, and explanations of these portions and components are omitted.

A food product forming line 300 includes the conveying device 9, the dough supplying device 92 supplying the food dough sheet PS onto the conveying surface 91 of the conveying device 9, the dough cutting device 8 cutting the food dough sheet PS to form the dough piece P, the inner material discharging device 7 discharging the inner material F onto the dough piece P, a forming system 113 disposed on the conveying device 9, and the controlling device 5. The forming system 112 includes a moving mechanism 63 attached to a frame disposed on the conveying device 9, and a forming device 30 attached to the moving mechanism 63. The forming device 30 has the same structure as that of the forming device 10 in the first embodiment. The moving mechanism 63 includes an X-direction moving mechanism 301, a Y-direction moving mechanism 302, and a Z-direction moving mechanism 303. The X-direction moving mechanism 301 and the Y-direction moving mechanism 302 typically include respective linear guides which can move the forming device 30 in the X and Y directions, respectively.

When the dough piece P is supplied below the forming device 30, the folding operation is started. A starting timing may be based on the operation signal from the dough cutting device 8, as the first embodiment, or based on detection of the dough piece P by a detecting section (not shown) disposed upstream of the forming device 30.

The forming device 30 is moved to an initial position where the suction tool 23 is located above the one end PS of the dough piece P by using the moving mechanism 63 (alignment sub-operation). The forming device 30 is made follow the dough piece P at the same speed as that of the conveying device 9. The suction tool 23 is configured to hold the one end PS from its upside in the non-contact way.

Next, the one end PS of the dough piece P is suctioned from its upside by the suction tool 23 and hold it in the non-contact way. The forming device 30 is entirely raised by using the Z-direction moving mechanism 303 so that the one end PS of the dough piece P is lifted from the conveying surface 91. Then, a clearance is caused between the one end PS and the conveying surface 91 (lifting sub-operation).

Next, the one end PS is sandwiched and grasped between the free roller 33a and the suction tool 23, as the first embodiment (grasping sub-operation).

After the grasping sub-operation of the one end PS of the dough piece P, the overlapping sub-operation of the dough piece P is performed. Concretely, the forming device 30 is entirely moved in a direction from the one end PS toward the other end PT by using the X-direction moving mechanism 301, the Y-direction moving mechanism 302 and the Z-direction moving mechanism 303 so that the grasped one end PS is brought closer to the other end PT along a direction of the diagonal line. The dough piece P is gradually folded to the diagonal line (folding line) between the corner DR and the corner UL (overlapping sub-operation). After that, the peripheral portions of the dough piece P are pressed, as the first embodiment (pressing sub-operation).

After the pressing sub-operation of the peripheral portions of the dough piece P, the bonding sub-operation of bonding the one end PS (the corner DL) of the dough piece P with the other end PT (the corner UR) is performed. The third air cylinder 21 is contracted to raise the suction tool 23 attached to the upper jaw frame 22 so that the grasped one end PS is released. After that, the forming device 10 is entirely moved toward the other end PT (the corner UR) parallel to the conveying surface 91 by using the X-direction moving mechanism 301 and the Y-direction moving mechanism 302. Then, the free roller 33a of the supporting tool 33 is rolled on the one end PS to overlap the released one end PS onto the other end PT so that the one end PS and the other end PT are bonded with each other. Thus, the folded food product PP has been formed.

After that, to form a folded food product PP from the next-row dough piece P, the forming device 30 is entirely raised by using the Z-direction moving mechanism 303 and moved toward the upstream side to the initial position for the next-row dough piece P by using the X-direction moving mechanism 301 and the Y-direction moving mechanism 302.

Although the embodiments of the forming system and the forming device according to the present invention have been explained until now, the present invention is not limited to the explained embodiments and a variety of modifications are allowed.

Figure 11:
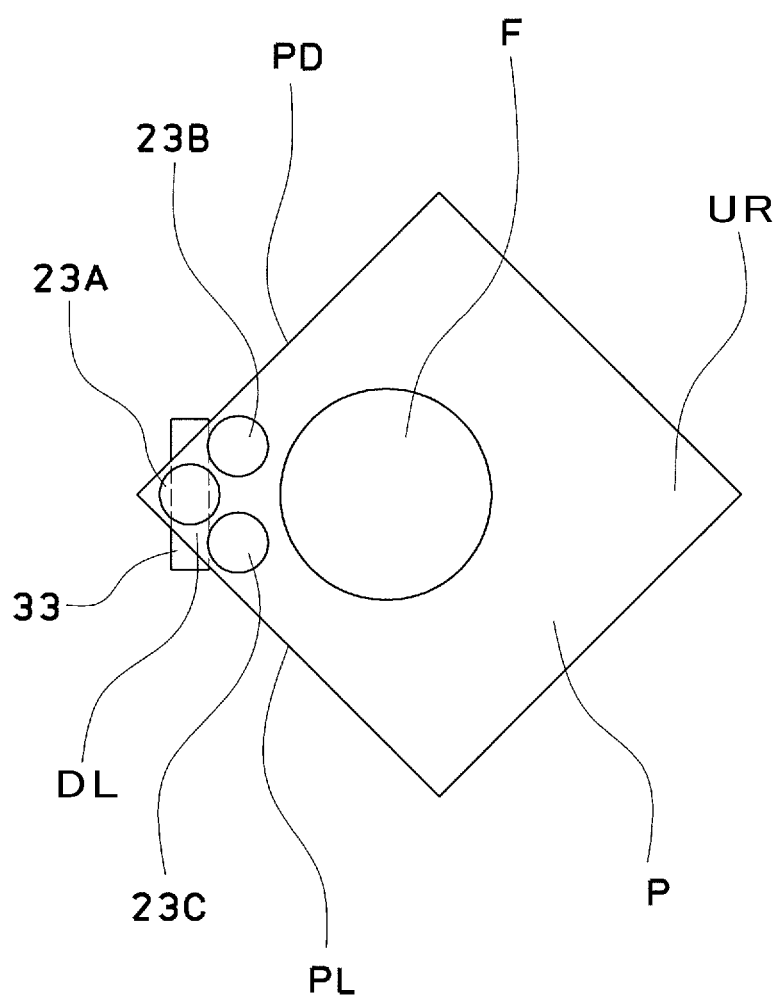
FIG. 11 is a top view of an alternative of suction tools in a forming device according to the present invention.

In the first and third embodiments, although the one suction tool 23 is disposed above the corner DL of the one dough piece P, a plurality of suction tools 23 may be disposed above the corner DL. For example, when a weight of the inner material F is large or the inner material F is disposed near the corner, the dough piece P held by the suction tool 23 is pulled downwardly during the lifting sub-operation so that a force of pulling the dough piece P away from the suction tool 23 may be caused. Then, when a clearance between a portion of the suction tool 23 and the dough piece P becomes large, a suction force of the suction tool 23 is reduced so that a position of the dough piece P with respect to the suction tool 23 may be shifted or the dough piece P may be separated away from the suction tool 23. This makes the folding operation unstable. In an alternative shown in FIG. 11, three suction tools 23A, 23B, 23C are disposed above the corner DL of the dough piece P in a triangular arrangement. The suction tool 23A is disposed at the same position as that of the suction tool 23 in the first embodiment (or above the one end), while the auxiliary suction tools 23B, 23C are offset in a direction from the one end toward the other end of the dough piece. Concretely, the auxiliary suction tools 23B, 23C are disposed near and above the sides PD, PL (above the one end region and the peripheral portions), respectively. In this case, the force of pulling the dough piece P away from the suction tool 23 affects the auxiliary suction tools 23B, 23C, rather than the suction tool 23A so that the suction force (or holding force) by the suction tool 23A is surely maintained. Thus, the dough piece P is prevented from being offset or separated from the suction tool 23 so that the folding operation becomes stable.

The suction tool used in the forming system and the forming device according to the present invention may be a non-contact-type suction tool 23 or a contact-type suction tool if it can hold the dough piece P from its upside. Further, a holding state of the dough piece P may be detected by adding a detecting sensor, such as a negative pressure sensor, to the suction tool 23. For example, when a state in which the suction tool 23 cannot hold the dough piece P is detected, the folding operation is controlled to be stopped. In this case, the inner material F is prevented from adhering the forming device due to mal-forming.

Further, the detecting section 54 used in the second embodiment may be introduced into the first or third embodiment to improve an accuracy of the folding operation. For example, a length of the dough piece P in the X direction (length of the side PL, PR) is measured by the upstream detecting element 541 and based on this information, a moving distance of the moving mechanism in the overlapping sub-operation can be corrected. Further, when the upstream detecting element 541 does not detect the inner material F, the folding operation may be controlled not to be performed so that a mal-product in which the inner material F does not present can be easily and visually checked. Further, the food product forming line may include a device of previously make a groove on the folding line of the dough piece P.

Further, although the forming systems and the forming devices in the above-stated embodiments are included in the food product forming line, the forming system and the forming device according to the present invention are not limited to those forming systems and those forming devices, and may be used, for example, in a system where the dough pieces P are disposed below the forming device by hand to perform the folding operation of the dough piece P which are fully arranged in a tray.

100, 200, 300: food product forming line
110, 111, 112, 113: forming system
10, 101, 20, 30: forming device
1: carrier
11: upper jaw base
12: connecting portion
13: first air cylinder
14: lower jaw base
2: The upper jaw unit
21: third air cylinder
22: upper jaw frame
23, 232: The suction tool
3: lower jaw unit
31: second air cylinder
32: attachment base
33, 331, 332: supporting tool
33a, 331a, 332a: free roller (the supporting part)
4: pressing unit
41: fourth air cylinder
42: pressing base
43, 431, 432: pressing tool
5: controlling device
51: storing section
52: calculating section
53: control section
54: detecting section
6, 60: robot (moving mechanism)
61: arm tip
63: moving mechanism
7: inner material discharging device
8: dough cutting device
81: circular cutter
82: guillotine-type cutter
83: signal transmitting section
9: conveying device
91: conveying surface
PS: dough sheet
P: dough piece
PP: folded food product

What is claimed:

1. A method of performing a folding operation of a dough piece having a first end, a second end, and a main body therebetween, and defining a folding direction from the first end to the second end, comprising:
    a lifting sub-operation of lifting the first end of a dough piece by holding the first end of the dough piece on a conveying surface while suctioning the first end of the dough piece from its upper side with a suction tool;
    a grasping sub-operation of grasping the first end of the dough piece by moving a supporting part below the lifted first end of the dough piece, then moving the suction tool and the supporting part closer to each other, and sandwiching the first end of the dough piece between the suction tool and the supporting part with the first end over the supporting tool and the suction tool is over the first end of the dough piece,
    an overlapping sub-operation of folding and overlapping the dough piece by moving the suction tool and supporting part with the first end of the dough piece over the supporting part and under the suction tool in the folding direction toward the second end of the dough piece such that the first end of the dough piece wraps under the supporting part, so that the first end of the dough piece becomes both above and below the supporting part, and
    a bonding sub-operation of bonding the first end and the second end of the dough piece to each other by raising the suction tool to release the first end of the dough piece, and moving the supporting part in the folding direction, such that the entire first end of the dough piece unwraps from the supporting part and completely moves under the supporting part, and the supporting part overlaps and presses the first end of the dough piece onto the second end of the dough piece on the conveying surface.

2. The method according to claim 1, wherein the supporting part is a free roller, and the first end and the second end of the dough piece are bonded to each other by allowing the free roller to roll, overlap and press the first end of the dough piece onto the second end of the dough piece on the conveying surface.

3. The method according to claim 1, wherein an inner material is deposited on an upper surface of the dough piece before the lifting sub-operation.

4. The method according to claim 3, wherein in the overlapping sub-operation, the first end of the dough piece is moved toward the second end of the dough piece along a moving trajectory with an upward-convex curve while the first end of the dough piece is held between the suction tool and the supporting part.

5. The method according to claim 1, further comprising a pressing sub-operation of pressing the overlapped peripheral portions of the dough piece with a pressing tool.

6. The method according to claim 5, wherein in the bonding and pressing sub-operations, a pattern is applied to the peripheral portions of the dough piece by the supporting part and the pressing tool.

7. The method according to claim 1, wherein the dough pieces are tightly arranged on the conveying surface.

8. The method according to claim 1, wherein the suction tool and the supporting part are attached to an arm of a robot to move the suction tool and the supporting part by the robot.

9. The method according to claim 1, wherein in the lifting sub-operation, the first end of the dough piece is held in a non-contact way by the suction tool.

10. The method according to claim 1, wherein in the lifting sub-operation, the first end of the dough piece is held by suctioning the first end with the suction tool and an auxiliary suction tool which is offset from the suction tool in a direction from the first end toward the second end of the dough piece.

\* \* \* \* \*